United States Patent [19]

Matsumoto et al.

[11] Patent Number: 4,928,186
[45] Date of Patent: May 22, 1990

[54] MAGNETIC RECORDING METHOD AND MAGNETIC HEAD

[75] Inventors: Takashi Matsumoto; Masamichi Sato, both of Tokyo; Satoshi Yoshida; Yoshiaki Kato, both of Kanagawa, all of Japan

[73] Assignee: Fuji Photo Film Co., Ltd., Kanagawa, Japan

[21] Appl. No.: 91,131

[22] Filed: Aug. 31, 1987

[51] Int. Cl.$^5$ .................................................. G11B 5/02
[52] U.S. Cl. .......................................... 360/21; 360/68
[58] Field of Search .......................... 360/21, 68, 60, 32, 360/66; 358/310, 315, 328, 340

[56] References Cited

U.S. PATENT DOCUMENTS

| 3,611,417 | 10/1971 | Souter et al. | 360/21 |
| 4,318,146 | 3/1982 | Ike et al. | 360/21 |
| 4,533,961 | 8/1985 | Shibata et al. | 358/310 X |
| 4,758,903 | 7/1988 | Noguchi et al. | 360/21 |

FOREIGN PATENT DOCUMENTS 61-129701 6/1986 Japan .
61-153803 7/1986 Japan .
2115598A 7/1983 United Kingdom ............ 360/21

Primary Examiner—Vincent P. Canney
Attorney, Agent, or Firm—Sughrue, Mion, Zinn, Macpeak & Seas

[57] ABSTRACT

In a magnetic recording/reproducing apparatus, desired information is recorded on a main track of a magnetic disk using a magnetic head. Other information is recorded on a guard band which is adjacent to the main track using another magnetic head. Each of the magnetic heads has a magnetic layer, an insulator layer, and a conductor layer formed of thin films. The heads are adjacent to each other in the widthwise direction of the track with a predetermined relative azimuth angle between them in which is greater than 0° and no greater than 45°. The magnetic head for the main track is applied with an optimum recording current. The magnetic head for the guard band is applied with a recording current so that its magnetomotive force is within the range of 40% to 80% of the magnetomotive force of the magnetic head for the main track.

9 Claims, 7 Drawing Sheets

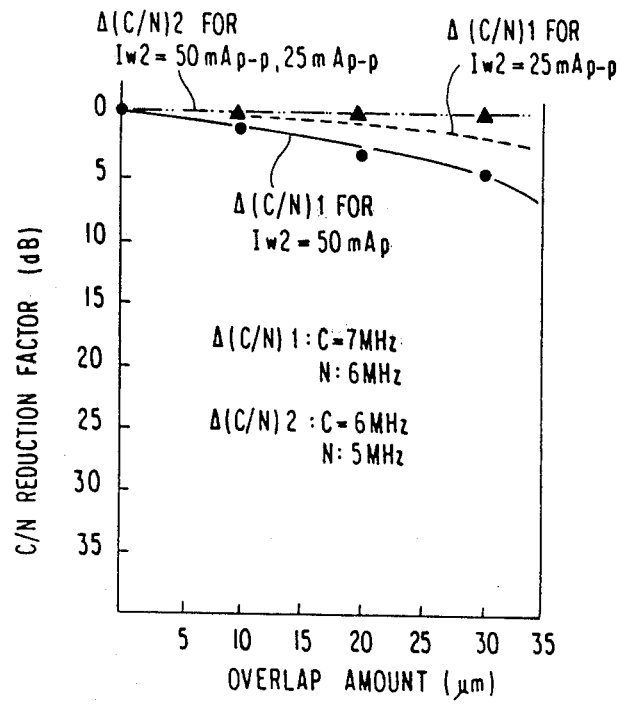
FIG. 2
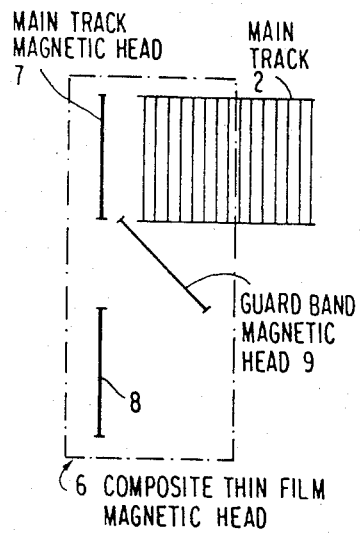
FIG. 3a
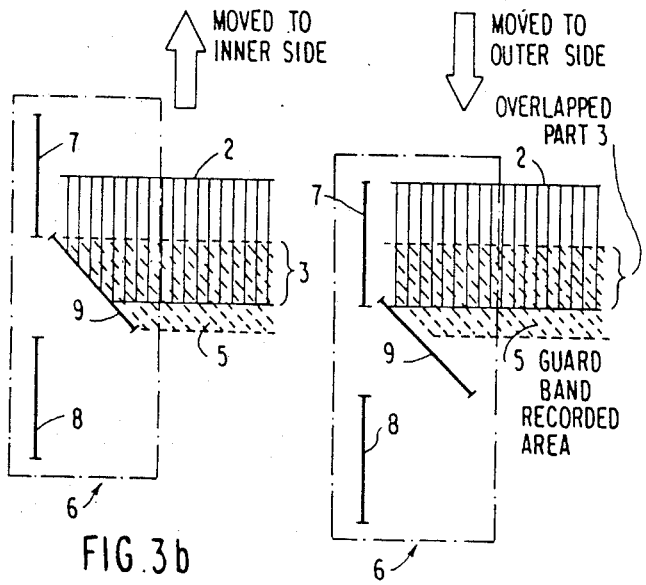
FIG. 3b
FIG. 3c

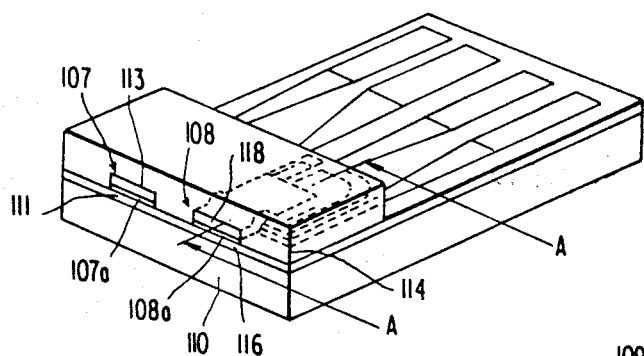
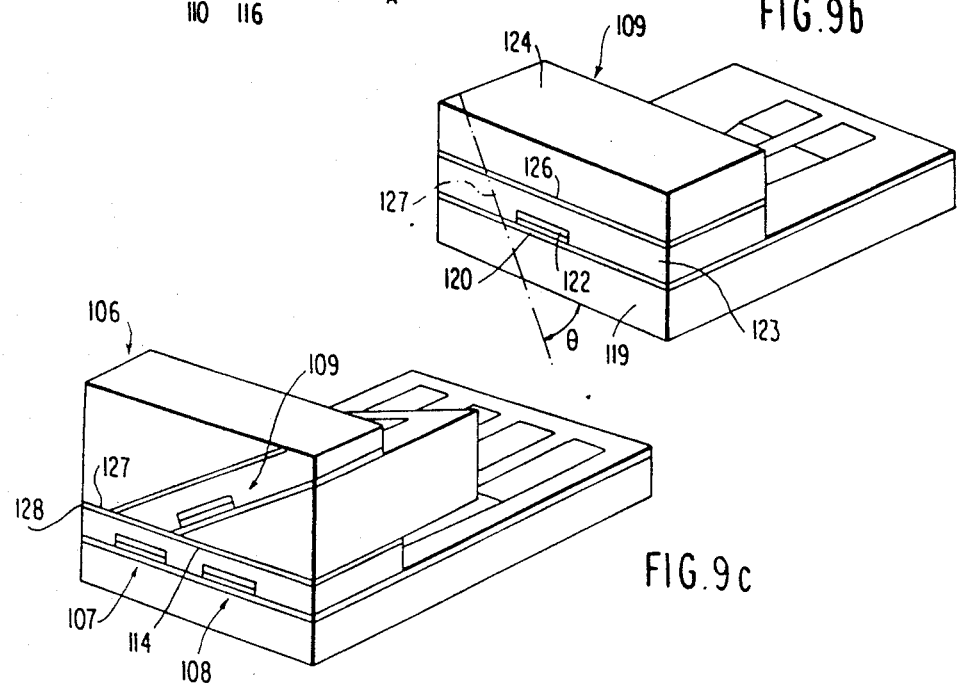
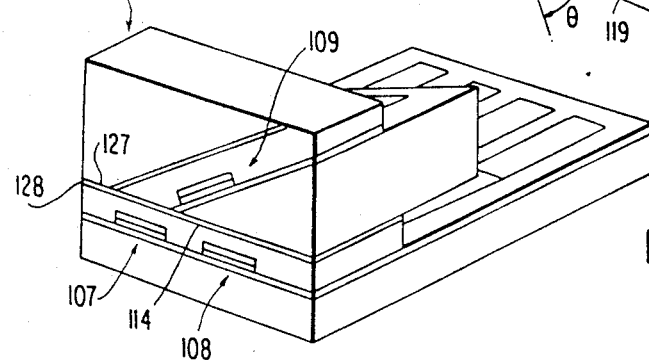
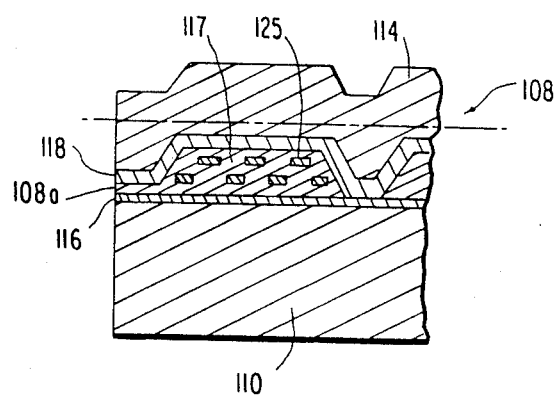
FIG.9a
FIG.9b
FIG.9c
FIG.10

4,928,186

MAGNETIC RECORDING METHOD AND MAGNETIC HEAD

FIELD OF THE INVENTION

This invention relates to a method for recording information on an annular gap called a guard band formed between annular main tracks of a magnetic disk. More specifically, this invention relates to a method for recording or reproducing predetermined information on the guard band by setting magnetomotive forces of a magnetic head for recording information on a main track and of a magnetic head for recording information on the guard band to an adequate relation between each other. Thus, information on the guard band is sufficiently and correctly recorded or reproduced without deteriorating the information recorded on the main track even if the magnetic head for guard band recording comes out of the guard band to the already recorded main track and overwrites the main track with other information.

This invention also relates to a magnetic head suitable for use in the above-described magnetic recording method.

BACKGROUND OF THE INVENTION

When recording information on a magnetic disk, for example, a flexible magnetic disk such as a floppy disk, the floppy disk is rotated and information is recorded on the annular tracks. In general, a guard band is provided between two adjacent tracks. The guard band is provided in order to absorb a tracking error caused by expansion or contraction of the floppy disk due to changes in temperature and by a positioning error due to precision of a head tracking mechanism.

Many types of magnetic recording devices using a floppy disk as a magnetic recording medium are available. For example, still picture recording device such as a so-called electronic still camera is known in the art. An image of a subject obtained through a lens is converted to an electrical signal and recorded onto a floppy disk. The floppy disk used for this purpose is called a video floppy disk. For reproduction, a device is used in which the floppy disk is rotated and the video signal recorded on the track is reproduced as a still picture on a display device such as a television receiver. In these devices, one field of video signals is recorded on one turn of the track. The method in which a still picture is reproduced from a one-field video signal is referred to as field recording/reproduction. Another method in which each field of the video signal from the same frame is on each of two tracks and the video signals from the two tracks are reconstructed to reproduce a single still picture is referred to as frame recording/reproduction. According to the specifications for electronic still cameras, the floppy disk is rotated at a speed of 3,600 rpm, and tracks of 60 μm in width are concentrically formed with a pitch of 100 μm. The guard band has a nominal width of 40 μm, and allowance of the track radius for expansion and contraction of the floppy disk is specified as ±14 μm.

When displaying a still picture on a television receiver or the like, the simultaneous output of sound or music has been taught as in Japanese Patent Applications Laid-open Nos. 129701/1986 and 153803/1986 which respectively disclose methods for recording such information on the guard band. In these methods, the normal track is used as a main track for recording a video signal, and an information signal such as sound or the like, which is compressed with respect to time, is recorded on the guard band between the main tracks, so that the relative azimuth between the main track and the guard band is adjusted. At reproduction, the recorded time-compressed information is expanded to the original time base. A magnetic head for recording the video signal on the main track and a magnetic head for recording the information signal on the guard band may be provided independently of each other, or integrally provided as proposed in the Japanese Patent Application Laid-open No. 129701/1986.

After the corresponding video signal is recorded on the main track, the information signal is recorded on the guard band adjacent to the main track.

As for the recording current, when the main track magnetic head and the guard band magnetic head have the same characteristics, both heads are applied with recording currents of the same value. This is because the video signal and the time-compressed information signal have almost the same frequency range and, in turn, have the same optimum recording current value. When the magnetic heads have different characteristics such as in number of coil turns, the magnetic heads normally have different optimum recording current values, but have almost the same magnetomotive forces. This is also true when the main track and the guard band are respectively recorded with video signals, or when the main track and the guard band are respectively recorded with any signals having almost the same frequency range.

As described above, a tracking error inevitably occurs. Therefore, as shown in FIG. 5, information is recorded on the guard band overlapping part 3 of a main track 2 of a magnetic disk 1. In this case, when information is already recorded on the main track 2, the information on the overlapped part 3 will be deteriorated. In FIG. 5, numeral 4 indicates the guard band, and numeral 5 indicates an information recording area which is recorded by the guard band magnetic head.

On the other hand, an integral type magnetic head disclosed in Japanese Patent Application Laid-open No. 129701/1986 has a sound signal recording magnetic head which is put between two video signal recording magnetic heads, and both side surfaces of the sound signal recording magnetic head closely contact over large areas with side surfaces of the video signal recording magnetic heads. The magnetic head having such a structure has a strong magnetic coupling between adjacent magnetic heads, and each signal flux leaks into adjacent magnetic heads which results in noises, that is so-called cross talk. As a result, the reproduced picture may be considerably disturbed, or noises may occur. Therefore, the above-described integral type magnetic head is defective and not suitable for practical use. No magnetic head has previously been developed which can satisfactorily record or reproduce information on both the main track and an adjacent guard band of the floppy disk.

SUMMARY OF THE INVENTION

In accordance with the present invention, a magnetic recording method is provided in which desired information is recorded on a main track of a magnetic disk using a magnetic head. Subsequently, other information is recorded on a guard band adjacent to the recorded main track using a magnetic head having a predetermined azimuth angle. The magnetic head for recording the main track is applied with a so-called optimum recording current. The magnetic head for recording the guard band is applied with a recording current so that its magnetomotive force is within the range of 40% to 80% of the magnetomotive force of the magnetic head for recording the main track.

A magnetic head according to the present invention is a composite thin film magnetic head comprising integrally a first magnetic head for recording and reproducing first information on the main track of the magnetic disk and a second magnetic head for recording and reproducing second information on the guard band adjacent to the main track. Each of the first and second magnetic heads is a thin film magnetic head comprising a magnetic layer, an insulator layer, and a conductor layer formed of thin films. The magnetic heads are disposed adjacent to each other in the widthwise direction of the track with a certain azimuth.

Another magnetic head is also provided according to the present invention which comprises a plurality of head chips disposed on the same plane of a head base plate with different azimuth angles, in which the plane of the head base plate having the head chips is slanted relative to the longitudinal direction of the track so that a plurality of tracks are formed on the magnetic disk by the individual head chips with no gaps.

BRIEF DESCRIPTION OF THE DRAWINGS

FIG. 2 is a characteristic chart showing variation in C/N of main track information and C/N of guard band information when the overlap amount is varied.

FIGS. 3(a), (b), and (c) are schematic views showing an experimental measuring method for obtaining characteristic charts in FIG. 1 and FIG. 2.

FIGS. 9(a), (b), and (c) are schematic oblique views showing structure of the composite thin film magnetic head in FIG. 7 based on the production process.

FIG. 10 is a schematic sectional view along the line A—A in FIG. 9(a).

DETAILED DESCRIPTION OF THE PREFERRED EMBODIMENTS

When information is recorded overlappingly on part of a main track using a guard band magnetic head, previously recorded information on the main track is deteriorated. It has been found that the degree of deterioration is reduced by decreasing the magnetomotive force of the guard band magnetic head to less than that of a main track magnetic head. Since, formerly, the guard band magnetic head was applied with an optimum recording current, the magnetomotive force of the magnetic head was comparable to that of the main track magnetic head, and a considerable deterioration of information on the main track resulted. Through experiments, it has been found that deterioration of information on the main track can be reduced to an allowable degree by decreasing the recording current for the guard band magnetic head to less than the optimum value to reduce the magnetomotive force of the guard band magnetic head to less than 80% that of the main track magnetic head.

On the other hand, when the magnetomotive force of the guard band magnetic head is too small, the guard band cannot be recorded with information satisfactorily. However, through experiments, it has been found that the guard band can be recorded with information satisfactorily when the magnetomotive force of the guard band magnetic head is more than 40% that of the main track magnetic head.

When the main track is applied with the optimum recording current as in the previous case, the main track is recorded with information very satisfactorily and deterioration of the recorded information at recording the guard band can be reduced.

Figure 4:
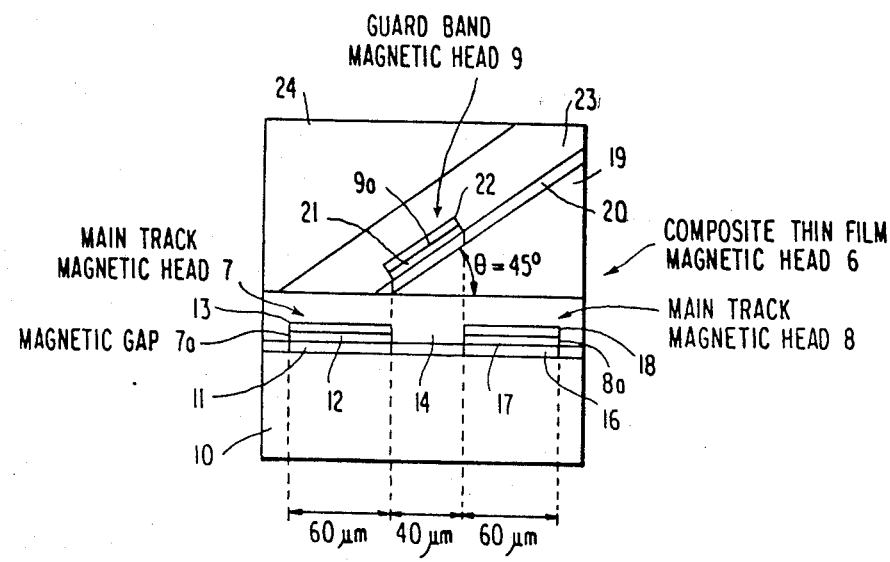
FIG. 4 is a schematic front view showing sliding surface of a magnetic head used in the experiment.
Figure 5:
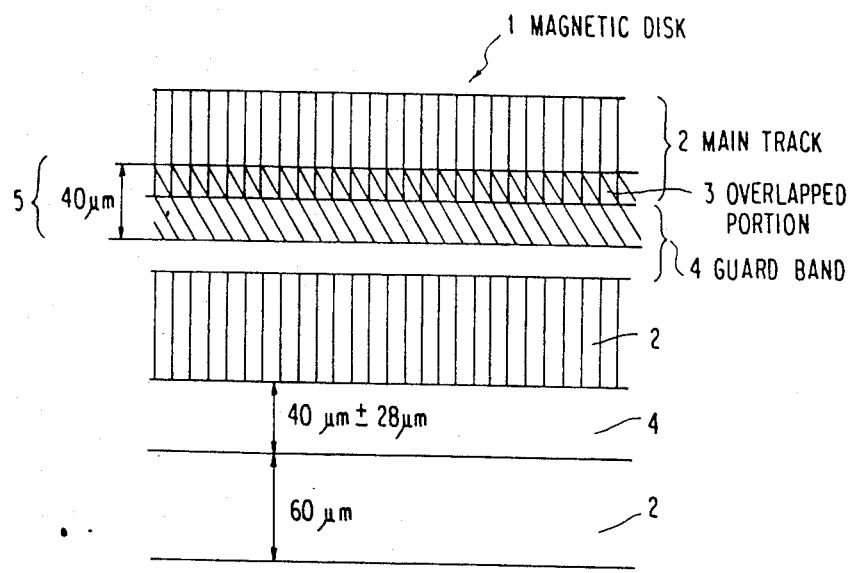
FIG. 5 is a schematic view showing recording of other information overlapping part of the main track.

The magnetic recording method according to the present invention will now be described in detail with reference to FIGS. 1 to 4. In the experiment, a floppy disk for an electronic still camera was used, and measurement was carried out using the worst-condition, 50th track (located at the innermost side of the recording area where the relative speed between the magnetic head and the recording medium is the smallest) as a main track. The floppy disk was rotated at a speed of 3,600 rpm according to the specification, and recorded using a 3-channel composite thin film magnetic head 6 as shown in FIG. 4.

The magnetic head 6 integrally comprises two main track magnetic heads 7 and 8, and a guard band magnetic head 9. Specifically, each of the magnetic heads 7, 8, and 9 is a thin film magnetic head in which a magnetic layer, a conductor layer, and an insulator layer are formed based on thin films. Referring to FIG. 4, a magnetic ferrite substrate 10 is sputtered with a magnetic alloy to form lower magnetic layers 11 and 16 of the thin film magnetic heads 7 and 8. Insulator layers 12 and 17 are formed on the lower magnetic layers 11 and 16, and coil conductors (not shown) are formed on the insulator layers 12 and 17. These layers are further sputtered with the magnetic alloy to form upper magnetic layers 13 and 18, which are covered with a protective layer 14. The thin film magnetic head 9 which comprises a substrate 19, a lower magnetic layer 20, an insulator layer 21, a coil conductor (not shown), an upper magnetic layer 22, and a protective layer 23 is bonded, using a low-melting glass or the like, onto the magnetic heads 7 and 8. Numeral 24 indicates a non-magnetic protective plate which is adhered to the protective layer 23 with the low-melting glass or the like.

The two main track magnetic heads 7 and 8 have magnetic gaps 7a and 8a which form tracks of 60 μm in width with azimuth angles of zero. The magnetic gaps 7a and 8a of the magnetic heads 7 and 8 are disposed apart from each other by a distance of 40 μm in the width direction of the tracks to form a guard band of 40 μm in width. On the other hand, the guard band magnetic head 9 has a magnetic gap 9a to form a 40 μm width track with an azimuth angle of 45 degrees. The magnetic head 9 is disposed so that the track formed by the magnetic head 9 is adjacent to the main tracks formed by the two magnetic heads 7 and 8. The magnetic heads 7, 8, and 9 are manufactured to give the same magnetomotive force when applied with the same recording current, and have a gap length of 0.33 μm and an optimum recording current of 50 mAp-p (milliamperes peak-to peak) for recording frequency modulated video signals.

Further, in the experiment, the main track was recorded with a single-frequency signal of 7 MHz and the guard band was recorded with a single-frequency signal of 6 MHz. This is because the main track is normally recorded with video signals and, according to the electronic still camera specification, the luminance signal is frequency modulated with a sync tip level of 6 MHz and a deviation of 1.5 MHz, which can be represented by the 7 MHz single-frequency signal. The guard band is normally recorded with a time-compressed audio frequency signal, and the time-compressed signal is frequency modulated around a central carrier frequency of 6 MHz, which can be represented by the 6 MHz single-frequency signal.

Experiment 1

Relation between the recording current and deterioration of a first information was experimentally determined by varying the recording current for the guard band magnetic head 9. The measurement conditions are shown in Table 1.

TABLE 1

|  | Main track recording | Guard band recording |
| --- | --- | --- |
| Track width | 60 μm | 40 μm |
| Azimuth angle | 0 degrees | 45 degrees |
| Recording frequency | 7 MHz | 6 MHz |
| Recording current | Iw1 = 50 mAp-p (constant) | Iw2 varied |
| Magnetic head | Magnetic head 7 or 8 | Magnetic head 9 |
| Gap length | 0.33 μm | 0.33 μm |
| Measured value | (C/N)1 | (C/N)2 |

As shown in FIG. 3(a), the 7 MHz single-frequency is recorded on the main track 2 using, for example, the inner-side main track magnetic head 7 of the composite thin film magnetic head, which is applied with a recording current Iw1=50 mAp-p which is the optimum recording current. Then, as shown in FIG. 3(b), the composite magnetic head 6 is moved to the inside by 30 μm assuming an overlap amount of 30 μm as a worst-case off-track, and the 6 MHz single-frequency signal is recorded on an area 5 using the guard band magnetic head 9.

After the guard band recording, with the composite thin film magnetic head 6 unmoved from the position in FIG. 3(b), signal in the area 5 is reproduced using the guard band magnetic head 9, and its C/N is measured, where C is the 6 MHz signal and N is 5 MHz noise, which is represented as (C/N)2.

Then, the composite thin film magnetic head 6 is moved to outside by 30 μm to the same position as shown in FIG. 3(a), signal on the main track 2 is reproduced by the magnetic head 7, and its C/N is measured, where C is the 7 MHz signal and N is 6 MHz noise, which is represented as (C/N)1.

Figure 1:
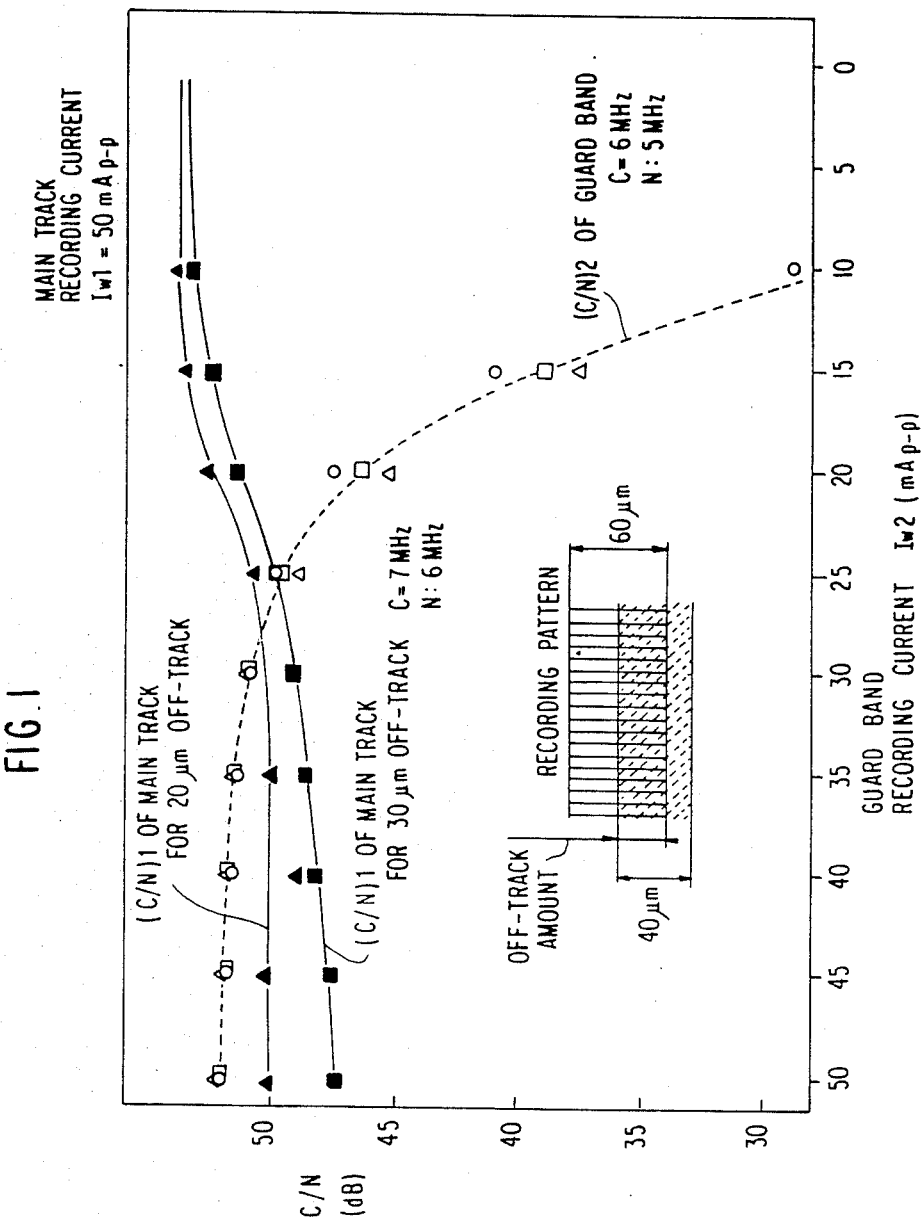
FIG. 1 is a characteristic chart showing variation in C/N of main track information and C/N of guard band information when the recording current for the guard band magnetic head is varied.

The above described measurement was carried out by varying the recording current Iw2 of the guard band magnetic head 9 within the range from 50 mAp-p to 10 mAp-p. The result of the measurement is shown in FIG. 1. It can be seen from FIG. 1 that (C/N)1 and (C/N)2 are more than 48 dB and 45 dB, respectively, even for the maximum off-track amount of 30 μm when Iw2 is within the range from 20 mAp-p to 40 mAp-p, and video signals which are required to have high picture quality can be recorded with practically satisfactory quality even for the case where the video signals are recorded on both main track and guard band. The magnetomotive force of the guard band magnetic head 9 for Iw2=20 mAp-p is 40% that of the main track magnetic heads 7 and 8, and the magnetomotive force of the magnetic head 9 for Iw2=40 mAp-p is 80% that of the main track magnetic heads 7 and 8.

As can be seen from FIG. 1, when Iw2 is less than 25 mAp-p, (C/N)1 is more than 50 dB which is suitable for further improved picture quality. Therefore, the magnetomotive force of the guard band magnetic head 9 is more preferably within the range of 40% to 50% that of the main track magnetic heads 7 and 8.

Experiment 2

Relation between the overlap amount and deterioration of information was experimentally determined by varying the overlap amount. The measurement method and conditions were the same as those in Experiment 1, except for the overlap amount which was varied and the recording current Iw2 of the guard band magnetic head 9 was set to 50 mAp-p or 25 mAp-p.

The experimental result is shown in FIG. 2. The vertical axis of FIG. 2 is for the reduction factors of (C/N)1 and (C/N)2, or Δ(C/N)1 and Δ(C/N)2, with respect to the case where the overlap amount is zero. As can be seen from FIG. 2, the reduction factor of (C/N)1 increase as the overlap amount of the guard band magnetic head 9 to the main track increases. The reduction factor of (C/N)1 decreases as the recording current of the guard band magnetic head 9 decreases. The reduction tendency relative to the overlap amount is the same irrespective of the recording current value. On the other hand, (C/N)2 is not affected by the overlap amount.

In the above-described Experiment 1 and Experiment 2, the main track magnetic heads 7 and 8 have azimuth angles of zero, and the guard band magnetic head 9 has an azimuth angle of 45 degrees, and the same tendency is seen for other azimuth angles. Thus, by setting the magnetomotive force of the magnetic head 9 to 40%–80% that of the main track magnetic head 7 or 8, information can be satisfactorily recorded on the guard band without significant deterioration of information recorded on the main track. For example, satisfactory recording can be made when a relative azimuth angle between the main track magnetic heads 7 and 8 and the guard band magnetic head 9 is more than 10 degrees, and each of the main track magnetic heads 7 and 8 and the guard band magnetic head 9 has an absolute azimuth angle of 45 degrees or less, preferably 40 degrees or less. When the azimuth angles of the main track magnetic heads 7 and 8 are zero, the azimuth angle of the guard band magnetic head 9 is preferably within the range of about 20 degrees to about 45 degrees, more preferably within the range of about 25 degrees to about 45 degrees.

In Experiment 1 above, an overlap amount of 30 $\mu$m is assumed as a worst-case off-track. In view of the electronic still camera specification, in which the floppy disk is allowed to have expansion or contraction of $\pm 14$ $\mu$m, it is considered that there may occur an overlap amount of about 30 $\mu$m in the worst case.

In Experiment 1 and Experiment 2, the main track has a width of 60 $\mu$m, and the guard band has a width of 40 $\mu$m, and the same tendency is seen for other widths. Thus, by setting the magnetomotive force of the magnetic head 9 to 40%–80% that of the main track magnetic head 7 or 8, information can be satisfactorily recorded on the guard band without significant deterioration of information recorded on the main track.

As described above, in the magnetic recording method according to the present invention, the magnetomotive force of the guard band magnetic head is set within the range from 40% to 80% that of the main track magnetic heads, thereby satisfactorily recording information on the guard band without significant deterioration of information recorded on the main track even if the guard band magnetic head has an off-track onto the previously recorded main track and part of the main track is recorded with another information.

The main track is recorded mainly with video signals, but can be recorded with any types of signals. And, the guard band is basically recorded with any types of signals. Normally, when the main track is recorded with video signals, the guard band is primarily recorded with time-compressed audio signals.

Figure 6:
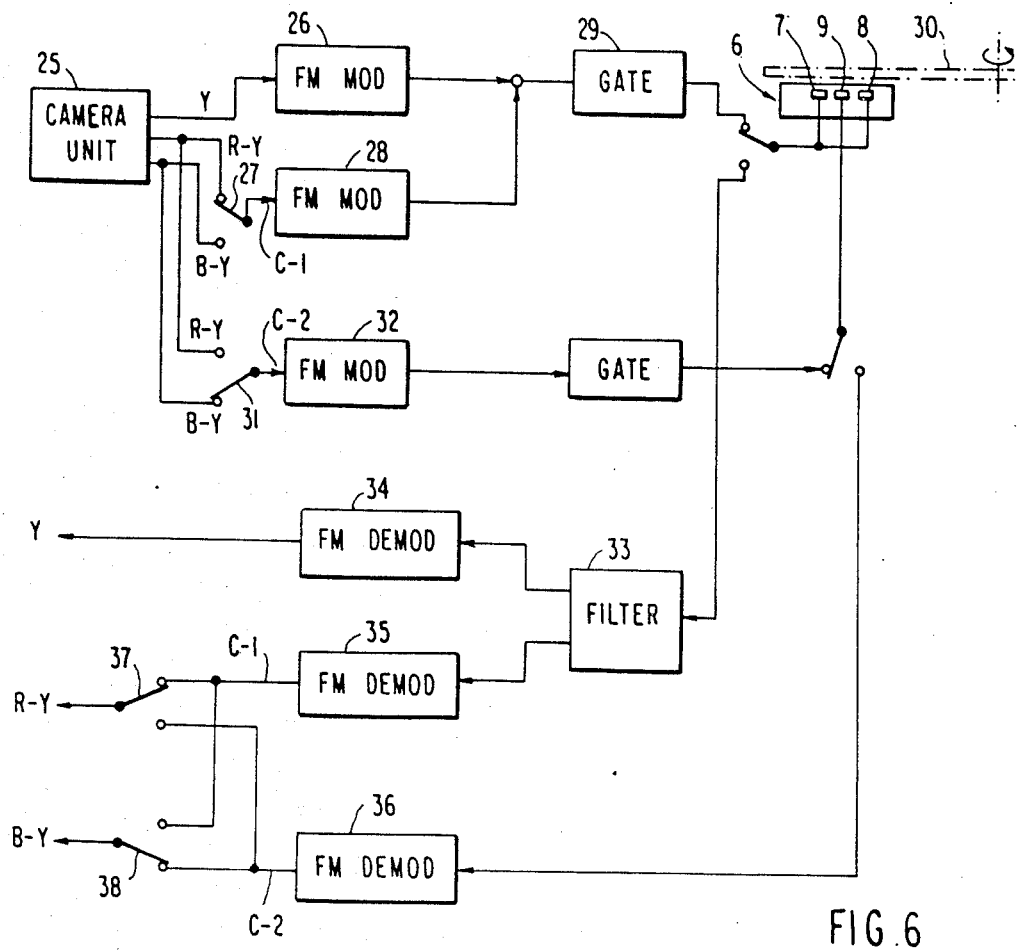
FIG. 6 is a block diagram of a recording/reproduction circuit.

FIG. 6 shows an example in which the main track and guard band are both used for recording and reproduction of video signals. Referring to FIG. 6, a luminance signal Y of video signals of a still picture obtained by a camera unit 25 is inputted to an FM modulator 26. Two color difference signals R-Y and B-Y are alternately selected line by line (line-sequentialized) by a switch 27, and a chrominance signal C-1 is inputted into an FM modulator 28. Both outputs of the FM modulators are added, passed through a gate circuit 29, and recorded on a main track of a floppy disk 30 by the main track magnetic head 7 or 8 of the composite thin film magnetic head 6. The procedure up to this step is the same as the electronic still camera specification. Additionally, the two color difference signals R-Y and B-Y are inputted into another switch 31, and a line which is not selected by the switch 27 is alternately selected (line-sequentialized) by the switch 31. A chrominance signal C-2 is modulated by an FM modulator 32, passed through a gate circuit, and recorded on the guard band of the floppy disk 30 by the guard band magnetic head 9 of the composite thin film magnetic head 6. The floppy disk 30 is rotated at a speed of 3,600 rpm.

When the video signal is reproduced according to the electronic still camera specification, only a signal detected by the magnetic head 7 or 8 is used to obtain the luminance signal and two color difference signals using a conventional reproduction system (not shown).

On the other hand, when reproducing the video signal not in accordance with the electronic still camera specification, the luminance signal Y is separated by a filter 33 from the signal detected by the magnetic head 7 or 8, and demodulated by an FM demodulator 34. The line-sequentialized chrominance signal C-1 is separated from the signal detected by the magnetic head 7 or 8, and demodulated by an FM demodulator 35. Further, the line-sequentialized chrominance signal C-2 is obtained from the signal detected by the magnetic head 9 through an FM demodulator 36. The two chrominance signals C-1 and C-2 are alternately selected line by line by the switch 37, and the color difference signal R-Y is outputted. The two chrominance signals C-1 and C-2 are also inputted into another switch 38 to alternately select a line which is not selected by the switch 37, and the color difference signal B-Y is outputted. The demodulators 35 and 36 can be alternatively disposed after the switches 37 and 38, respectively.

Next, the composite thin film magnetic head will be described in detail. Recently, a thin film type magnetic head has been developed for use in high-density recording, which comprises a magnetic layer, a conductor layer, and an insulator layer which are based on thin films stacked on a substrate. Extensive research has been conducted to produce a magnetic head which allows high-precision tracking without increasing the size of the system, and can record both a video signal and another signal other than a video signal such as sound or music on the same disk eliminating problems such as the occurrence of cross talk and without decreasing the number of tracks for the video signal.

As a result, as briefly described with reference to the composite thin film magnetic head 6 shown in FIG. 4, a magnetic head which satisfies all of the above conditions can be obtained by forming a thin film type video signal magnetic head and a thin film type information signal magnetic head and integrally combining these magnetic heads into a composite thin film magnetic head.

In accordance with the present invention which has been derived from the above-described findings and through further research on detailed structure, there is provided a composite thin film magnetic head comprising integrally a thin film type video signal magnetic head and a thin film type information signal magnetic head, in which both magnetic heads are disposed adjacent to each other in the widthwise direction of the track with an azimuth relative to each other.

The composite thin film magnetic head can be any of a 2-track magnetic head having two magnetic heads of which one head is used for field recording and reproduction of video signals and the other head is used for recording and reproducing an information signal such as sound on a track, called a guard band, adjacent to inner or outer periphery of a video signal track (main track), a 3-track magnetic head having three magnetic heads of which two heads are used for frame recording and reproduction of video signal on two tracks and the other head is used for recording and reproducing an information signal on a track called a guard band between the two tracks for video signal, and a 4-track magnetic head having four magnetic heads of which two heads are used for frame recording and reproduction of video signal on two tracks and the other two heads are used for recording and reproducing information signals on a track between the two tracks and a track adjacent to inner or outer periphery of the two tracks. When the video signal magnetic head and the information signal magnetic head are almost adjacent to each other in the widthwise direction of the track, which means that two pairs of the magnetic layer and the insulator layer on the sliding surface which define the track width are disposed to form tracks adjacent to each other on the disk, both magnetic heads may have a shift in position between the heads in the direction perpendicular to the track width. The magnetic heads may also be disposed so that the tracks formed adjacent to each other on the disk are partly overlapped or have a slight gap between them. The conductor layer and other parts of the magnetic heads are allowed to partly overlap each other.

It is needless to say that the video signal magnetic head can be used for recording signals other than video signals, or the information signal magnetic head can be used for recording video signals, thus these names of the magnetic heads are conventional ones.

In the composite thin film magnetic of the above-described configuration, of which the video signal magnetic head and the information signal magnetic head are formed based on thin films, these magnetic heads can be disposed adjacent to each other in the widthwise direction of the track with an azimuth between the heads, thereby considerably reducing the occurrence of cross talk between the magnetic heads. Since both magnetic heads are disposed integrally, both heads are assured to have even and normal head touch, and precision tracking is obtained with no need for a complex mechanism. Further, the relative positions and azimuth angles of both magnetic heads can be precisely set at ease, thereby providing improved interchangeability.

Figure 7:
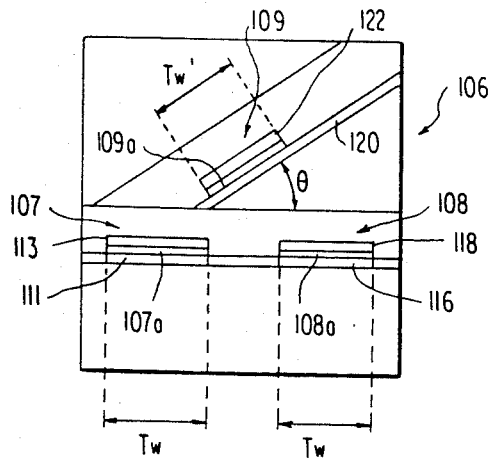
FIG. 7 is a schematic front view showing a sliding surface of a composite thin film magnetic head of an embodiment of the present invention.

Preferred embodiments of the composite thin film magnetic head according to the present invention will now be described with reference to the drawings. FIG. 7 is a schematic front view showing the sliding surface of an embodiment of the composite thin film magnetic head according to the present invention, with generalized track width and azimuth angle of the above-described composite thin film magnetic head 6 shown in FIG. 4. Referring to FIG. 7, a composite thin film magnetic head 106 has two video signal magnetic heads 107 and 108, and a sound signal magnetic head 109 which has an azimuth angle θ relative to the video signal magnetic heads 107 and 108 and is disposed adjacent to the video signal magnetic heads 107 and 108 in the direction of track width Tw of the video signal magnetic heads 107 and 108. The three magnetic heads 107, 108, and 109 are thin film magnetic heads formed based on thin films as will be described hereinafter, which record and reproduce video signals and sound signals by sliding magnetic gaps 107a, 108a, and 109a disposed between upper magnetic layers 113, 118, and 122 and lower magnetic layers 111, 116, and 120, respectively, against a flexible disk, that is a floppy disk.

Figure 8:
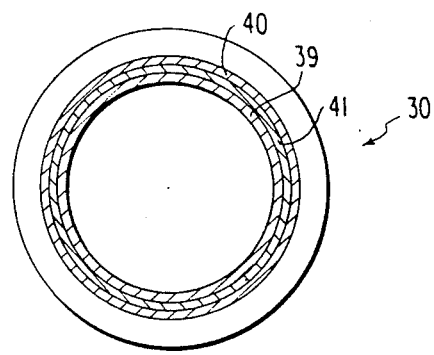
FIG. 8 is a schematic plane view of a floppy disk.

The composite thin film magnetic head 106 is a 3-track composite thin film magnetic head for frame recording and reproduction of video signals. As shown in FIG. 8, a floppy disk 30 is recorded with video signals on its main tracks 39 and 40 for video signals, one field on each track, by the two video signal magnetic heads 107 and 108 of the magnetic head 106. A sound signal track is formed by the sound signal magnetic head 109 on a part 41, which is conventionally a guard band, between the two main tracks 39 and 40. Thus, with the composite thin film magnetic head 106, a sound signal can be recorded and reproduced without decreasing the number of tracks for video signals.

Specifically, the sound signal magnetic head 109 is applied with a recording current so that the magnetomotive force of the sound signal magnetic head is within the range of 40% to 80% that of the video signal magnetic heads 107 and 108, thereby providing satisfactory recording and reproduction. Further, there is provided a relative azimuth of 10 degrees or more between the sound signal magnetic head 109 and the video signal magnetic heads 107 and 108, and each of the magnetic heads 107, 108, and 109 has an absolute azimuth angle of 45 degrees or less, preferably 40 degrees or less, thereby providing satisfactory recording and reproduction.

Structure of the composite thin film magnetic head 106 will now be described in detail based on the production process with reference to FIG. 9 and FIG. 10. Referring to FIG. 9(a), when producing the composite thin film magnetic head 106, first the 2-track video signal magnetic heads 107 and 108 are formed based on thin films using a conventional method known in the art. The method for forming the video signal magnetic head 108, for example, will be described with reference to FIG. 10 which is a sectional view taken along a line A—A in FIG. 9(a). A sendust alloy is sputtered on a substrate 110 comprising a magnetic ferrite to form the lower magnetic layer 116. Then, on the lower magnetic layer 116, an $SiO_2$ film which is an insulating material and a Cu film which is a coil material are formed using a conventional method known in the art, which are etched to form an insulator layer 117 and a coil conductor 125 as shown. Then, a sendust alloy is sputtered on these layers as in the case of the lower magnetic layer 116 to form the upper magnetic layer 118. Further $SiO_2$ is sputtered onto the upper magnetic layer 118 to form a protective layer 114. The protective layer 114 is polished and flattened down to the position shown by the dot-bar line in FIG. 10 to obtain a video signal magnetic head 108. Part of the insulator layer 117 located between the upper magnetic layer 118 and the lower magnetic layer 116 constitutes the gap 108a. The other video signal magnetic head 107 is formed on the same substrate as for the video signal magnetic head 108 after forming the lower magnetic layer 111 integrally with the lower magnetic layer 116, using the same procedure.

On the other hand, as shown in FIG. 9(b), an upper magnetic layer 122 and a lower magnetic layer 120 together with a conductor layer and an insulator layer are stacked on a substrate 119, which is separate from the substrate 110, to form the sound signal magnetic head 109. After a protective layer 123 of the sound signal magnetic head 109 is flattened, a protective plate 124 comprising a non-magnetic ferrite is adhered onto the protective layer 123, using an adhesive 126 such as based on low-melting glass. The sound signal magnetic head 109 is cut along the line shown by the dot-bar line in FIG. 9(b) to form a joint surface 127 with the video signal magnetic heads 107 and 108. An angle θ between the joint surface 127 and the substrate 119 determines the azimuth angle of the sound signal magnetic head 109 relative to the video signal magnetic heads 107 and 108. The angle θ is preferably selected within the range $0 < θ ≦ 45$ degrees, and it is 45 degrees in this embodiment.

After the sound signal magnetic head 109 is cut and processed as needed, the joint surface 127 is placed on the protective layer 114 of the 2-track video signal magnetic heads 107 and 108 as shown in FIG. 9(c), and bonded using aa adhesive 128 such as based on low-melting glass. The thus obtained composite thin film magnetic head 106 is further subjected to processing of the sliding surface as needed and completed.

Figure 11:
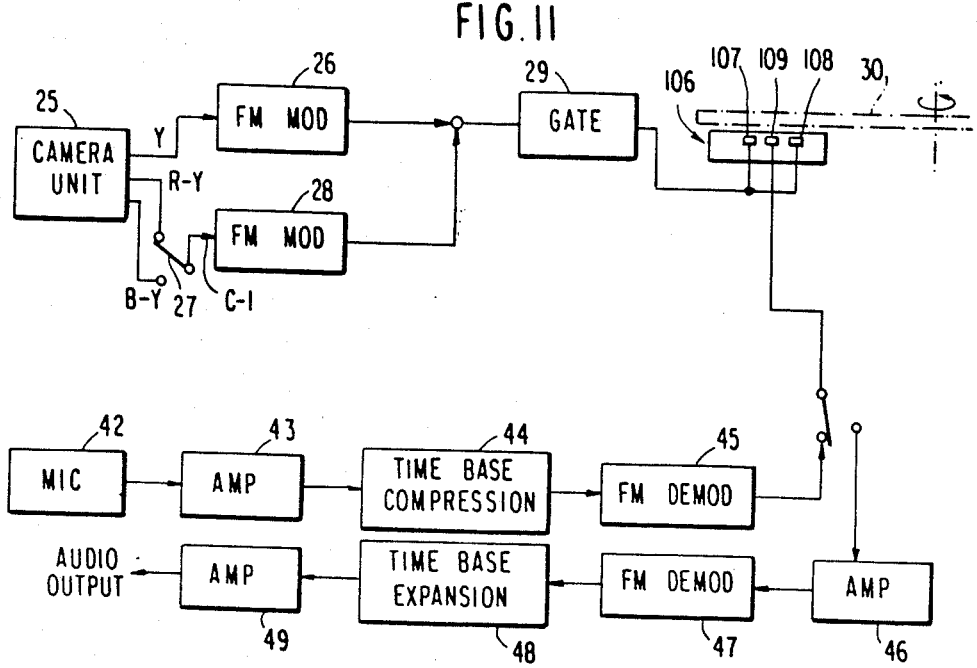
FIG. 11 is a block diagram of a recording/reproduction circuit for a video signal and a sound signal.

In the composite thin film magnetic head 106, both the video signal magnetic heads 107 and 108 have a track width Tw of 60 μm, and the sound signal magnetic head 109 also has a track width Tw' of 60 μm. The gaps 107a, 108a, and 109a of these magnetic heads 107, 108, and 109 have thicknesses of 0.3 μm. Using the magnetic head 106, recording and reproduction of video signal and 10-second sound signal were carried out on a floppy disk rotating at a speed of 3,600 rpm. FIG. 11 is a block diagram of a circuit for recording and reproduction of video and sound signals by the composite thin film magnetic head 106.

Luminance and color difference signals of a still picture obtained by a camera unit 25 were modulated in FM modulators 26 and 28, passed through a gate 29, and recorded on the main tracks 39 and 40 of the floppy disk 30 by the video signal magnetic heads 107 and 108 of the 3-track composite thin film magnetic head 106. On the other hand, a sound signal obtained by a microphone 42 was amplified by an amplifier 43, and compressed to 1/60 second by a time base compression circuit 44. The time-compressed sound signal was passed through an FM modulator 45 and recorded on the sound signal track 41 of the floppy disk 30 by the sound signal magnetic head 109 of the composite thin film magnetic head 106. The video signal magnetic heads 107 and 108 were applied with the optimum recording current, and the sound signal magnetic head 109 was applied with a recording current so that the magnetomotive force of the sound signal magnetic head 109 was within the range from 40% to 80% that of the video signal magnetic heads 107 and 108. When reproducing the sound signal, the sound signal recorded on the floppy disk 30 was also detected by the information signal magnetic head 109, amplified by an amplifier 46, demodulated by an FM demodulator 47, and reconstituted by a time base expansion circuit 48 to the original 10-second sound signal. The reconstituted sound signal was outputted as a sound signal through an amplifier 49. The video signal was also detected by the video signal magnetic heads 107 and 108, and displayed as a still picture by a conventional reproduction system (not shown) known in the art on a display unit such as a television receiver. In the reproduction of the still picture, disturbance by the sound signal, that is a cross talk, was −44 dB, with no interference with the picture. Also, there was noted no noise from the video signal in the reproduction of the sound signal.

Another embodiment of the 3-track composite thin film magnetic head according to the present invention will now be described, in which the substrates of the video signal magnetic heads and the sound signal magnetic head are based on a non-magnetic ferrite, the upper and lower magnetic layers of each magnetic head are based on an amorphous Co-Nb-Zr magnetic material, the relative azimuth angle is 30 degrees, the track width Tw' of the sound signal thin film magnetic head is 46 μm, and materials and structures of other parts are the same as those used in the previously described embodiment. A video signal was recorded on a magnetic recording disk using one of the two video signal magnetic heads, and a sound signal was recorded on a track adjacent to the video signal track using the sound signal magnetic head. The video signal and sound signal recorded on the magnetic disk were reproduced using the same composite thin film magnetic head, and there were noted no disturbance of picture nor noises.

Thus, in the composite thin film magnetic head according to the present invention, of which the video signal magnetic heads and the sound signal magnetic head are both based on thin films, the magnetic heads can be easily disposed integrally adjacent to each other in the track width direction with an azimuth relative to each other. Therefore, each magnetic head is assured to have a proper head touch, thereby providing precision tracking and preventing increase in cross talk.

Figure 12A:
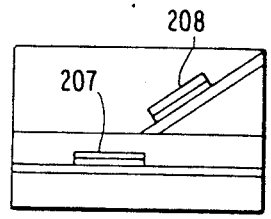
FIGS. 12(a) and (b) are schematic front views showing a sliding surface of a composite thin film magnetic head of another embodiment according to the present invention.
Figure 12B:
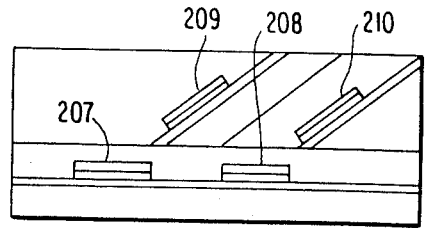

The above embodiments have been described for 3-track composite thin film magnetic heads as examples. However, alternatively, the composite thin film magnetic head according to the present invention may be a 2-track composite thin film magnetic head having, as shown in FIG. 12(a), a 1-track video signal magnetic head 207 and a 1-track sound signal magnetic head 209 disposed adjacent to each other with an azimuth relative to each other, or a 4-track magnetic head having, as shown in FIG. 12(b), 2-track video signal magnetic heads 207 and 208 and 2-track sound signal magnetic heads 209 and 210. The 4-track composite thin film magnetic head allows recording of a sound of twice the length of time for the 2-track or 3-track composite thin film magnetic head, or stereo sound recording. Or, alternatively, in the frame recording, the chrominance signal C-2 described in FIG. 6 can be recorded on two guard bands. Moreover, the above embodiments have been described for the cases where the information signal other than the video signal is sound signal, however, needless to say, the information signal is not restricted to a sound signal, but can be any other types of information signals. Further, the shapes and materials of the magnetic heads constituting the composite thin film magnetic head according to the present invention are not restricted to those shown in the embodiments. For example, the conductor layer can be a single layer. The substrate can be based on a ferromagnetic material so that it functions as the lower magnetic layer.

As described above in detail, with the composite thin film magnetic head according to the present invention, the video signal magnetic head and the information signal magnetic head are formed based on thin films, integrally disposed adjacent to each other in the track width direction with an azimuth relative to each other, thereby assuring even and normal head touch and eliminating the need for a complex mechanism for tracking, without an increase in size and cost of the whole system. Further, each magnetic head can be easily formed at a predetermined position with a predetermined azimuth angle, thereby providing improved interchangeability. Moreover, the magnetic heads are disposed with an azimuth relative to each other, occurrence of cross talk can be sufficiently reduced. Therefore, the guard band between the conventional video signal main tracks can be used as a track for information signal recording, which allows recording and reproduction of the information signal without decreasing the number of video signal tracks, thereby enabling reproduction of picture and sound with very reduced noises, and providing advantageous functions for practical applications.

Next, a method for recording information on a guard band between main tracks using another type of magnetic head will be described. The magnetic head has a plurality of head chips disposed on the same plane of a head base plate with different azimuth angles, in which the head base plate is slanted relative to the longitudinal direction of tracks so that a plurality of tracks are formed on a floppy disk with no spacings by the individual head chips. With such an arrangement, the head chips can have a sufficiently large spacing between each other, and since the head chips have different azimuth angles, occurrence of cross talk is prevented even when information signals are recorded on the main track and conventional guard band adjacent to each other, or when the recording or recorded information signals are different from each other. An embodiment of the recording method according to the present invention will be described in detail with reference to the drawings.

Figure 13:
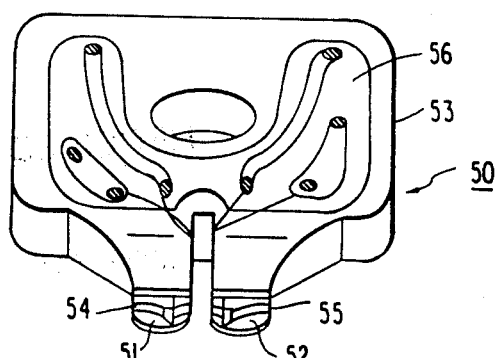
FIG. 13 is a schematic oblique view showing a magnetic head according to another invention.

Referring to FIG. 13, two magnetic head chips 51 and 52 which are bulk heads with different azimuth angles are disposed on the same plane of a head base plate 53. In FIG. 13, numerals 54 and 55 indicate coils, and numeral 56 indicates a printed circuit board.

Figure 14:
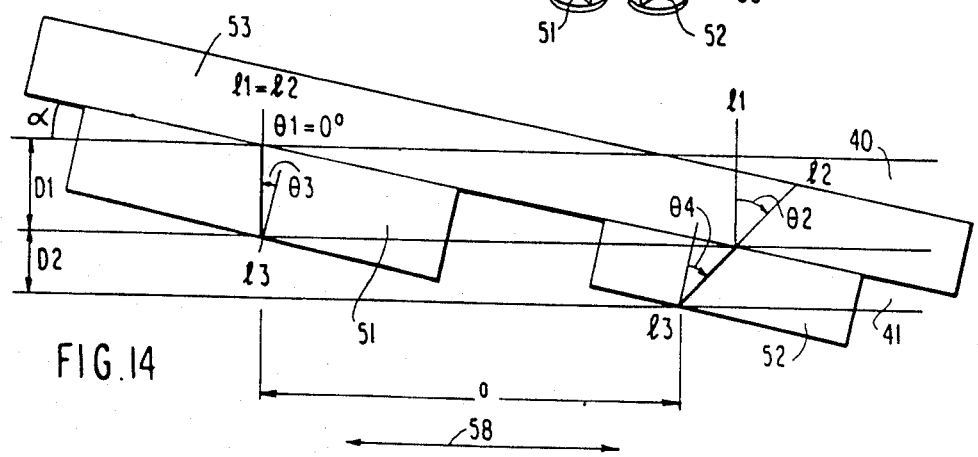
FIG. 14 and FIG. 15 are schematic views showing the magnetic head in FIG. 13 together with a magnetic recording medium.

In such a magnetic head 50, as shown in FIG. 14, the plane of the head base plate 53 on which the head chips 51 and 52 are disposed is slanted relative to a longitudinal direction 58 of tracks 40 and 41 so that the two tracks 40 and 41 are formed with no spacing on the floppy disk 30 as a magnetic recording medium by the individual head chips 51 and 52. Normally, a width D1 of the main track 40 is determined by the specification. In the electronic camera specification, D1 is specified as 60 $\mu$m. In this embodiment, the conventional guard band 41 which is used as a new recording track has a width of 40 $\mu$m. This embodiment describes a case where the main track 40 is recorded with a video signal and the track 41 is recorded with a sound signal by after recording, in which the width D1 of the main track 41 is 60 $\mu$m and a width D2 of track 41 is 40 $\mu$m. In this case, a distance "a" between the head chips 51 and 52 which is sufficiently large for preventing cross talk is determined, and then a slant angle $\alpha$ of the head base plate 53 and azimuth angles $\theta3$ and $\theta4$ of the head chips 51 and 52 can be determined considering the track widths D1 and D2 and azimuth angles $\theta1$ and $\theta2$ in view of an azimuth loss at the reproduction. The azimuth angles $\theta1$ and $\theta2$ are angles of a gap direction l2 of the head chips 51 and 52 with respect to a line l1 which is perpendicular to the longitudinal direction of the tracks 40 and 41. In this embodiment, $\theta1=0$ degrees and $\theta2=-20$ degrees (where counter-clockwise direction is positive). Difference between the azimuth angles $\theta1$ and $\theta2$ is set to an extent that a large azimuth loss is obtained and adverse effects of off-track can be substantially cancelled even when one of the head chips 52 and 51 traces one of the tracks 40 and 41 which is to be reproduced by the other of the head chips 51 and 52. The azimuth angles $\theta3$ and $\theta4$ are angles of the gap direction l2 of the head chips 51 and 52 with respect to a line l3 which is perpendicular to the surface of the head base plate 53 on which the head chips 51 and 52 are mounted. In this embodiment, $\theta3=10$ degrees, $\theta4=-10$ degrees, and distance "a"=300 $\mu$m.

Using the above-described magnetic head 50, a video signal and a sound signal were recorded on the floppy disk using the same procedure as shown in FIG. 11. In this case, the head chip 51 was applied with the optimum recording current to record the video signal on the main track 40. Then, for recording the sound signal on the guard band 41, the head chip 52 was applied with a recording current so that its magnetomotive force is within the range from 40% to 80% that of the head chip 51. As a result, satisfactory recording was performed. When the sound signal was recorded on the track 41 by the head chip 52 while reproducing the video signal recorded on the track 40 by the head chip 51, the cross talk amount was $-30$ dB or less.

Figure 15:
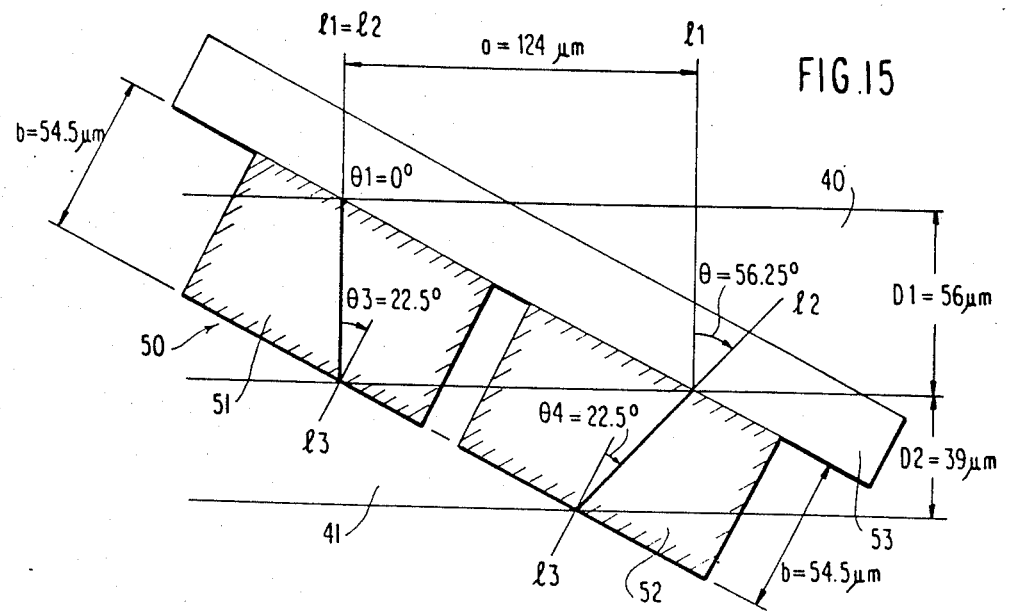

The production process for the magnetic head 50 can be simplified when dimensions of the head chips 51 and 52 are the same, in particular when a length "b" of a side parallel to the line l3 is the same for both the head chips 51 and 52 and absolute values of the azimuth angles $\theta3$ and $\theta4$ are the same. The magnetic head 50 and its specification for the above case are shown in FIG. 15.

What is claimed is:

1. A magnetic recording method comprising the steps of:
    recording first information on a main track of a magnetic disk using a first magnetic head with an adequate recording current; and
    recording second information on a guard band adjacent to said recording main track using a second magnetic head having a predetermined non-zero azimuth angle relative to said first magnetic head with a magnetomotive force set within a range of 40% to 80% of a magnetomotive force of said magnetic head for said main track.

2. A magnetic recording method as claimed in claim 1, wherein said first and second information is recorded by a composite thin film magnetic head, said composite thin film magnetic head comprising:
    said first magnetic head for recording said first information; and
    said second magnetic head for recording said second information;
    wherein each of said first and second magnetic heads are thin film magnetic heads comprising a magnetic layer, an insulator layer, and a conductor layer formed of thin films.

3. A magnetic recording method as claimed in claim 2, wherein said first and second magnetic heads are disposed adjacent to each other in a widthwise direction of the track and have a relative azimuth angle between them which is greater than 0° and no greater than 45°.

4. A magnetic recording method according to claim 3, wherein said relative azimuth angle is no less than 25° and no greater than 45°.

5. A magnetic recording method as claimed in claim 1, wherein a magnetic head comprising a first head chip and a second head chip having different azimuth angles disposed on the same plane of a head base plate is used, said head base plate is slanted, and said first information is recorded by said first head chip and said second information is recorded by said second head chip.

6. A magnetic recording method according to claim 1, wherein said range of magnetomotive force is 40% to 50%.

7. A magnetic recording method according to claim 1, wherein said main track is recorded with video signals and said guard band is recorded with time-compressed audio signals.

8. A composite thin film magnetic head comprising:
    a first magnetic head for recording and reproducing first information on a main track of a magnetic disk; and
    a second magnetic head for recording and reproducing second information on a guard band adjacent to said main track;
    wherein each of said first and second magnetic heads are thin film magnetic heads comprising a magnetic layer, an insulator layer, and a conductive layer formed of thin films, and said first and second magnetic heads are disposed adjacent to each other in a widthwise direction of the track and have a non-zero relative azimuth angle, said second magnetic head having a magnetomotive force set within a range of 40% to 80% of a magnetomotive force of said first magnetic head.

9. A composite thin film magnetic head as claimed in claim 8, wherein the relative azimuth angle between said first magnetic head and said second magnetic head is greater than 0° and no greater than 45°.

* * * * *

UNITED STATES PATENT AND TRADEMARK OFFICE
CERTIFICATE OF CORRECTION

PATENT NO. : 4,928,186

DATED : May 22, 1990

INVENTOR(S) : Takashi Matsumoto

It is certified that error appears in the above-identified patent and that said Letters Patent is hereby corrected as shown below:

ON TITLE PAGE: left-hand column, bracket [30] entitled Foreign Application Priority Data" insert the following:

```
--   August 29, 1986    (JP)  Japan..............61-202893
     September 22, 1986 (JP)  Japan..............61-222086
     October 8, 1986    (JP)  Japan..............61-238113
                                                         --
```

Signed and Sealed this

Third Day of December, 1991

Attest:

HARRY F. MANBECK, JR.

Attesting Officer      Commissioner of Patents and Trademarks